(12) United States Patent
Hoffmann et al.

(10) Patent No.: US 11,865,761 B2
(45) Date of Patent: Jan. 9, 2024

(54) EXTRUSION HEAD AND METHOD FOR PRODUCING AN ELONGATED HOLLOW BODY BY MEANS OF SAID EXTRUSION HEAD

(71) Applicant: TROESTER GmbH & Co. KG, Hannover (DE)

(72) Inventors: Wieland Hoffmann, Hannover (DE); Andreas Grothe, Bergen (DE)

(73) Assignee: TROESTER GMBH & CO. KG, Hannover (DE)

( * ) Notice: Subject to any disclaimer, the term of this patent is extended or adjusted under 35 U.S.C. 154(b) by 0 days.

(21) Appl. No.: 17/481,375

(22) Filed: Sep. 22, 2021

(65) Prior Publication Data
US 2022/0097280 A1    Mar. 31, 2022

(30) Foreign Application Priority Data
Sep. 28, 2020   (DE) ...................... 10 2020 125 261.7

(51) Int. Cl.
*B29C 48/325*   (2019.01)
*B29C 48/92*    (2019.01)
*B29C 48/09*    (2019.01)

(52) U.S. Cl.
CPC ............ *B29C 48/325* (2019.02); *B29C 48/09* (2019.02); *B29C 48/92* (2019.02)

(58) Field of Classification Search
None
See application file for complete search history.

(56) References Cited

U.S. PATENT DOCUMENTS

| | | | |
|---|---|---|---|
| 2,349,178 A | 5/1944 | Kopitke | |
| 3,601,851 A | 8/1971 | Heidinger | |
| 3,676,039 A | 7/1972 | Hulstein | |
| 3,702,751 A | 11/1972 | Gottfried | |
| 4,770,620 A | 9/1988 | Steinecke et al. | |
| 2009/0206509 A1* | 8/2009 | Castiglioni | B29C 48/06 264/171.13 |
| 2019/0299514 A1 | 10/2019 | Silbermann et al. | |

FOREIGN PATENT DOCUMENTS

| | | |
|---|---|---|
| CN | 110328824 A | 10/2019 |
| DE | 1908933 A1 | 11/1970 |
| DE | 2023008 A1 | 12/1971 |
| DE | 2139108 A1 | 2/1972 |

(Continued)

*Primary Examiner* — Robert J Grun
(74) *Attorney, Agent, or Firm* — LEYDIG VOIT & MAYER LTD

(57) ABSTRACT

An extrusion head and a method for producing an elongated hollow body as an extrudate of an extrusion of extrusion material are provided. The extrusion head includes: a housing; a mandrel mounted in the housing, and a mouthpiece arranged downstream of the mandrel in a direction of extrusion. The extrusion material can flow around the mandrel in the direction of extrusion of the extrusion head. The mandrel includes an end-side mouthpiece section arranged in an opening of the mouthpiece so as to form a circumferential gap between the end-side mouthpiece section and an opening in the mouthpiece, and the mandrel is pivotable about at least one axis transverse to the direction of extrusion to change a geometry of the circumferential gap.

13 Claims, 1 Drawing Sheet

(56) References Cited

FOREIGN PATENT DOCUMENTS

| | | |
|---|---|---|
| DE | 6907010 U | 2/1972 |
| DE | 10237051 A1 | 2/2004 |
| DE | 102008061286 A1 | 6/2010 |
| DE | 102018204729 A1 | 10/2019 |
| EP | 0250828 A2 | 1/1988 |

* cited by examiner

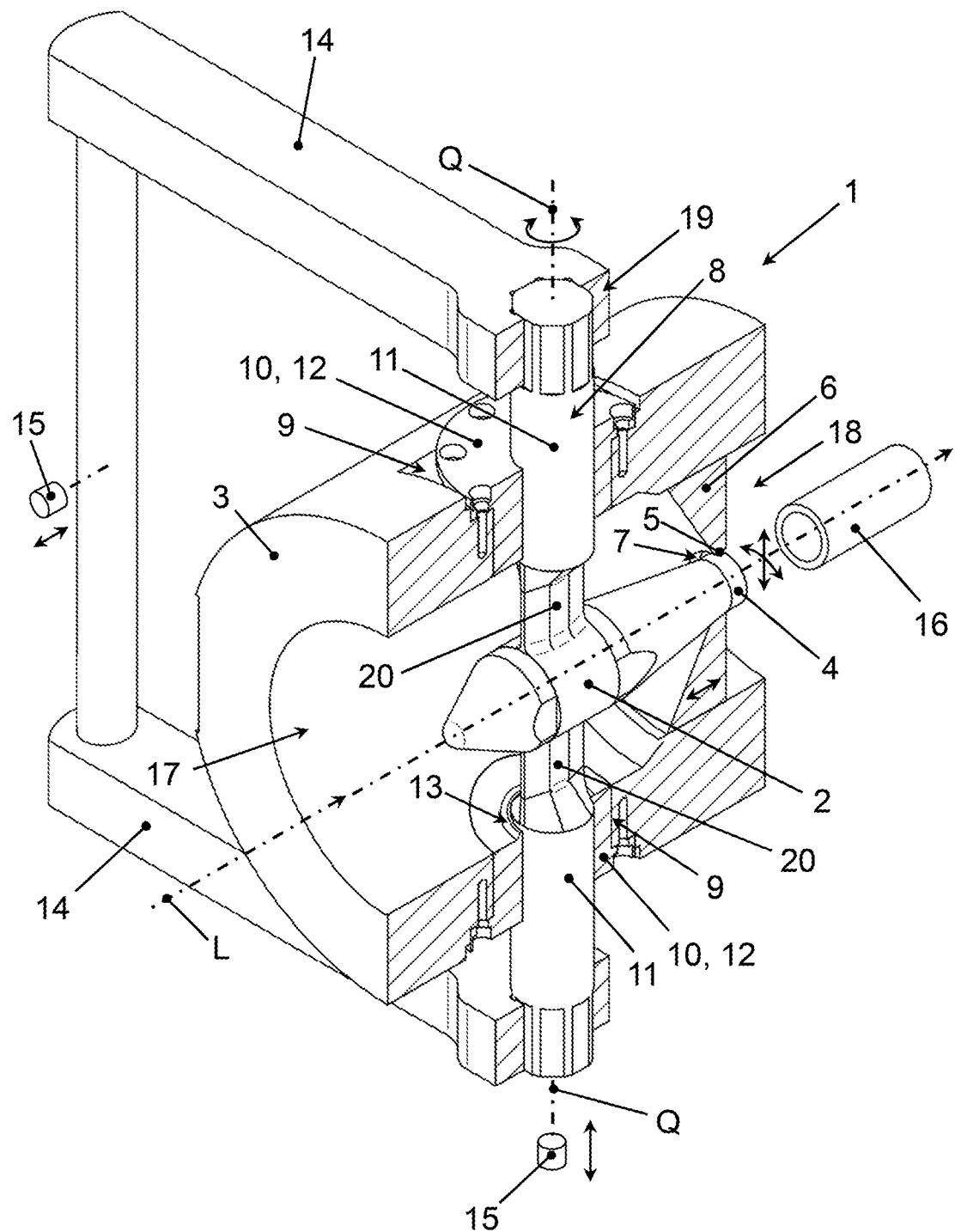

EXTRUSION HEAD AND METHOD FOR PRODUCING AN ELONGATED HOLLOW BODY BY MEANS OF SAID EXTRUSION HEAD

CROSS-REFERENCE TO PRIOR APPLICATIONS

Priority is claimed to German Patent Application No. DE 10 2020 125 261.7, filed on Sep. 28, 2020.

FIELD

The invention relates to an extrusion head having a mandrel mounted in a housing in a direction of extrusion such that an extrusion material can flow around it, and, in this case, an end-side mouthpiece section of the mandrel is arranged in an opening of a mouthpiece of the extrusion head arranged downstream of the mandrel in the direction of extrusion so as to form a circumferential gap, the geometry of which changes, between the mouthpiece section and the mouthpiece. The invention furthermore relates to a method for producing an elongated hollow body as extrudate of an extrusion of the extrusion material by means of said extrusion head.

BACKGROUND

The production of elongated hollow bodies, such as pipes or tubes, from an extrusion material, such as plastic, is regularly carried out by extrusion using an extruder, the extrusion or spray head of which has an annular gap.

In this case, the geometry of the annular gap naturally defines the geometric design of the hollow body, in particular its basic cross-sectional shape and wall thickness.

The formation of the annular gap is usually realized via a mandrel mounted within the extrusion head such that the extrusion material can flow around it, wherein a free end of the mandrel engages in an opening of a mouthpiece. If the mandrel and the mouthpiece are fixed and thus set in a position that is unchangeable in relation to one another, only an invariable geometry of the annular gap therefore exists which is determined by the shape of the mandrel and the opening of the mouthpiece.

However, such an invariable annular gap is to be considered disadvantageous for various reasons so that it is often desirable to design the annular gap in such a way that the geometry of the annular gap can be actively influenced. In the main, two basic objectives can be cited here as reasons for designing the geometry of the annular gap so that it can be influenced.

A first objective of influencing the geometry of the annular gap may consist of actively changing the geometric design of the hollow body itself over its length, in particular in its cross-sectional shape and/or wall thickness, as a function of the requirements placed on the hollow body. Accordingly, therefore, to produce a target change in the geometric embodiment of the hollow body as a production step in addition to the extrusion during the extrusion process.

With regard to the aforementioned objective, DE 2 139 108 A describes, for example, an extrusion head for producing tubular semi-finished products from a thermoplastic plastic. An insert, which for its part comprises a mandrel, is arranged in the extrusion head. The mandrel is arranged axially displaceably along the direction of extrusion and, during axial displacement, interacts with a stepped conically shaped inner surface of a mouthpiece, forming an annular gap nozzle, in such a way that the wall thickness of the semi-finished product can be changed in its axial direction. In the further processing of the semi-finished products having axially different wall thicknesses to form plastic bottles, for example, this creates the advantage that the bottle neck of the plastic bottle in particular has at least approximately the same wall thickness as the bottle body due to the formation in a blowing process.

The production of hollow bodies with wall thicknesses that are in each case different but are the same over the length of the hollow body using the same extrusion head can also be realized with such an axial wall thickness control.

In a comparable context, DE 102 37 051 A1 discloses an extrusion head for producing, in particular thin-walled, pipes with multiple curves, which extrusion head likewise has an axially displaceable mandrel along the direction of extrusion. An axial wall thickness control is realized via the formation of an annular gap between the mandrel and a nozzle body interacting with the mandrel and the axial displacement of the mandrel. Moreover, the nozzle body is designed to be displaceable in a plane normal to the direction of extrusion via two adjusting frames that are movable by adjustment devices so that the mandrel can be positioned eccentrically in the annular gap and a radial wall thickness control is accordingly realized in addition to the axial wall thickness control. As a result, the wall thickness in the curvature regions can be adapted practically optimally to the specified curvature both axially and radially.

On the other hand, a second objective of influencing the geometry of the annular gap, in contrast to the first objective, may consist in avoiding an actual change in the geometric design of the hollow body during the extrusion process and, as a result, achieving as uniform a design of the hollow body as possible over its length, in particular in its cross-sectional shape and/or its wall thickness. Given an invariable geometry of the annular gap, such undesirable actual changes can be achieved, for example, by adjustment inaccuracies of the mandrel in relation to the opening of the mouthpiece, the position displacement of which in relation to one another is produced due to forces acting on the mandrel and/or mouthpiece during the extrusion process and also due to temporarily and/or locally different properties of the extrusion material.

In connection with the second objective, DE 2 023 008 A also discloses an extrusion head in which, in a first embodiment, a nozzle bushing forming an annular gap with a mandrel comprises two sections separated from one another via a constriction. In this case, the upper section is firmly clamped and the constriction substantially forms a solid joint around which the lower section is designed to be practically pivotable in a plane normal to the direction of extrusion via adjusting members, so that the annular gap can be adjusted radially in the region of the nozzle opening. The adjustment serves to readjust the geometry of the annular gap in the event that deviations from the desired geometric shape of the annular gap occur.

DE 10 2008 061 286 A1 also shows an extruder with a cross head and a method for producing tubular hollow bodies. In this case, an extruder nozzle formed on a pivotable sleeve forms an adjustable annular gap with a mouthpiece arranged on the housing of the extruder. In order to adjust the annular gap, the sleeve is designed to be pivotable about two pivot axes via two hydraulic cylinders.

DE 10 2018 204 729 A1 furthermore discloses a tool head of a hollow profile extruder which comprises a tool mandrel that forms an annular channel with a tool ring. The tool mandrel is supported by a mandrel carrier, which is mounted so as to be tiltable about two degrees of freedom via a tilting joint. Homogenization of a wall thickness of an extruded tube in the circumferential direction is thus possible. The wall thickness of the tube to be extruded can also be specified via a predeterminable axial position of the tool ring relative to the tool mandrel.

EP 0 250 828 A2 also describes an extruder having a spray head for sheathing a cable. In this case, a central mandrel of the spray head is pivotably and fixedly mounted in the spray head via a joint having spherical surfaces.

The generic DE 19 08 933 A also describes an extruder having a mandrel that forms an annular gap with a nozzle bushing. In this case, the mandrel is mounted via an adjusting lever and a spherical bearing head in the nozzle bushing so as to be pivotable about the longitudinal axis of the adjusting lever so that a cross-sectional change in the annular gap in the pivot direction is made possible.

With respect to the prior art, it can be stated that, irrespective of the objective, the technical solutions for realizing an axial and radial annular gap adjustment take place with comparable means. However, the solutions shown have the disadvantage of being individual solutions which therefore cannot be retrofitted to already widely available extruders. However, it is often desirable for already existing extruders to have the possibility of adjusting annular gaps and thus of controlling wall thickness in order to increase the dimensional accuracy of the hollow bodies produced.

SUMMARY

According to an embodiment of a first aspect of the disclosure, an extrusion head is provided for producing an elongated hollow body as an extrudate of an extrusion of extrusion material. The extrusion head includes: a housing; a mandrel mounted in the housing; and a mouthpiece arranged downstream of the mandrel in a direction of extrusion. The extrusion material can flow around the mandrel in the direction of extrusion of the extrusion head. The mandrel includes an end-side mouthpiece section arranged in an opening of the mouthpiece so as to form a circumferential gap between the end-side mouthpiece section and an opening in the mouthpiece, and the mandrel is pivotable about at least one axis transverse to the direction of extrusion to change a geometry of the circumferential gap.

According to a second aspect of the disclosure, a method for producing an elongated hollow body as an extrudate of an extrusion of extrusion material using the extrusion head of the first aspect is provided. The method includes: determining a deviation of an actual shape of the extrudate from a target shape of the extrudate, and adjusting the mandrel of the extrusion head to compensate for the deviation.

Against this background, the object is to provide an extrusion head which is suitable for retrofitting already widely available extruders with a gap adjustment. In addition, a method is to be provided by means of which the dimensional accuracy of the hollow bodies produced can be increased by means of the extrusion head.

BRIEF DESCRIPTION OF THE DRAWINGS

The present invention will be described in even greater detail below based on the exemplary FIGURES. The invention is not limited to the exemplary embodiments. Other features and advantages of various embodiments of the present invention will become apparent by reading the following detailed description with reference to the attached drawings which illustrate the following:

FIG. 1 illustrates a sectional view of an extrusion head, in accordance with an embodiment.

DETAILED DESCRIPTION

According to an embodiment of this disclosure, an extrusion head (or also spray head) is provided, wherein the extrusion head has a mandrel, which is in particular torpedo-shaped, arranged in a housing of the extrusion head. The mandrel is mounted such that an extrusion material can flow around it in—at least—one direction of extrusion of the extrusion head. Furthermore, the mandrel has an end-side mouthpiece section which is freely arranged in an opening of a mouthpiece of the extrusion head arranged downstream of the mandrel in the direction of extrusion. In this case, with the mouthpiece, the mouthpiece section of the mandrel forms a circumferential gap the geometry of which is variable or adjustable. According to the invention, the adjustability of the gap results from the fact that the mandrel is mounted in the housing of the extrusion head so as to be pivotable, in particular perpendicularly, normally or even transversely to the direction of extrusion about at least one axis. It is conceivable for the mandrel to be mounted on one side or via one point of the housing. However, the mandrel is preferably mounted on two sides, i.e., via two points in the housing so as to be pivotable about the axis. It should also be noted that the direction of extrusion runs along the longitudinal axis of the extrusion head or coincides with the longitudinal axis.

Due to the pivotable or also pivotably movable mounting of the mandrel about an axis transverse to the direction of extrusion, a gap or a wall thickness adjustment having a degree of freedom is established in the extrusion head. Consequently, the geometry of the circumferential gap between the mouthpiece section and the opening can also be changed transversely to the direction of extrusion. The gap or wall thickness adjustment thus formed in the extrusion head enables, in direct relationship, the wall thickness and, associated therewith, the basic cross-sectional shape to be adapted in the transverse axial direction of a hollow body extruded by means of the extrusion head. In this case, in particular in the circumferential direction of the cross-section.

The adaptation could certainly take place with the objective of adapting the geometric design of the elongated hollow body according to a requirement placed on the hollow body. However, the adaptation preferably takes place with the objective of ensuring a substantially uniform wall thickness and, associated therewith, a uniform cross-sectional shape over the length of the extruded hollow body.

In a preferred embodiment, the opening of the mouthpiece as well as of the mouthpiece section of the mandrel engaging in the opening has a circular cross-section. In this case, a radius of the mouthpiece section is always smaller than a radius of the opening of the mouthpiece so that the circumferential gap between the mouthpiece section and the opening would be formed as an annular gap. In this context, it is conceivable for the mouthpiece section of the mandrel to have a constant radius and thus a cylindrical shape over its longitudinal extension along the longitudinal axis of the mandrel.

Starting from a circular cross-section of the mouthpiece section and opening described in the preceding paragraph, the geometry of the annular gap is changed in the radial direction, which is accompanied by an adaptation of the geometric design along the longitudinal axial direction of the elongated hollow body in its radial direction. As a result, a radial annular gap and radial wall thickness adjustment would also be established in the extrusion head in an axial direction.

The elongated hollow body itself can in this case, in particular, be designed as a tube or a pipe. Depending on the extrusion material used, in particular plastics, a higher or lower elasticity can be present.

Advantageously, the extrusion head according to the invention is suitable for beneficially retrofitting already widely available extruders due to the concentration of components necessary for adjusting the gap in the extrusion head itself, which increases the sustainability of said extruders beyond measure.

In addition, in a particularly advantageous development of the invention, the mandrel is additionally mounted to be longitudinally movable in the direction of, or along, the axis and thus transversely to the direction of extrusion. This provides a further degree of freedom of the movement of the mandrel perpendicular to the degree of freedom that is realized via the pivoting about the same axis. To the same extent, a further degree of freedom is provided for changing the geometry of the circumferential gap, wherein a change in the geometry of the gap or annular gap and also the adaptation of the geometric design of the extruded hollow body in a transverse plane can be realized with circular cross-sections of the mouthpiece section and opening in a radial plane as a result of the overlapping of the pivoting movement about the axis and the longitudinal movement along the axis. This significantly increases the possibility of compensating for possible deviations from a target shape that occur on the hollow body in the extrusion process. In addition, the mounting of the mandrel could be beneficially designed via only one bearing element, via which two degrees of freedom of movement of the mandrel can be provided at the same time.

Continuing on therefrom, a beneficial embodiment should provide that the mandrel is arranged, in particular centrally in the housing and/or with its longitudinal axis in the direction of extrusion, on an elongated holder embodying the axis. Specifically, the elongated holder should be designed as a mandrel holder in which a portion of the holder directly adjacent to the mandrel is designed as a thin-walled web. In this case, the web is arranged on the mandrel in such a way that the thin sides of the web, that is to say the two opposite sides of the web with the smallest dimensions, in particular in the unpivoted position of the mandrel, are aligned in the direction of extrusion so that a flow resistance of the web when the extrusion material flows around the mandrel is minimal. In one design variant, the holder may be designed in one piece only and thus may be connected to the mandrel on one side only and mounted on one side or at one point of the housing. However, due to the forces acting on the mandrel as a result of the extrusion material during the extrusion process, this can lead to too high a displacement of the mandrel and possibly a collision of the mouthpiece section with the mouthpiece. In order to avoid this, the holder is preferably designed in two parts, wherein the holder is correspondingly connected to the mandrel on two sides along the axis and is consequently also mounted on two sides or at two points of the housing.

Furthermore, an embodiment is to be regarded as promising if the extrusion head has at least one bearing element arranged in a bearing seat formed in the housing, wherein the holder is mounted in the bearing element, in a rotationally movable or rotationally and longitudinally movable manner, via a bearing section formed on the holder. In particular, the forces acting on the mandrel via the extrusion material during an extrusion process can thus be transmitted more efficiently, in particular without force-spraying, to the fixed housing, while the movements about and along the axis are advantageously subjected to only a slight influence or to none at all. Even if it is possible to provide only one bearing seat, one bearing element, and one bearing section for mounting the mandrel and thus a one-sided mounting of the mandrel, it is preferable for optimally distributing the forces acting during an extrusion process to design a two-sided mounting of the mandrel via two bearing seats, two bearing elements, and two bearing sections. In general, a seat in the bearing element and the bearing section are advantageously designed to be as cylindrical as possible. In particular, the bearing element could be designed as a plain bearing, for example as a bearing bush. In this case, it is possible for such a bearing bush to be formed in several parts and, in the case of a multi-part design, to preferably be formed in two parts. The bearing bush would also preferably be made of a bronze, in particular of an aluminum bronze. In order to avoid or at least minimize a tendency to react with the extrusion material, it can be feasible for the bearing bush to have a protective coating on a surface located on the inside of the housing. For example, the surface could be chromed for this purpose.

In a practice-oriented design, it is moreover provided that a contact seal is formed between the bearing element and the bearing section of the holder. The arrangement of such a contact seal, which consists in particular of a rubber, between the bearing section and the bearing element offers a proven and cost-effective solution for sealing the extrusion head against leakage of extrusion material. In this case, there is advantageously a wide selection of standard geometries.

In the context described above, it should be feasible as a further development for the bearing element to be a bearing bush and for a sealing lip to be formed at the end side of the bearing bush, in particular facing away from a bushing flange and/or, in the installed position of the bearing bush, facing away from the bearing seat. The sealing lip should be formed integrally with the bearing bush and thus formed therefrom, wherein the sealing lip preferably tapers in the direction of the mandrel, for example conically. Due to the pressure acting on the bearing bush via the extrusion material during an extrusion process and the forces thus acting on the sealing lip in the direction of the holder, a sealing effect between the bearing bush and the holder, in this case in particular the bearing section, is increased, whereby leakage of extrusion material from the housing of the extrusion head can be minimized or even prevented.

In a development of the aforementioned design variants, a contrary approach for preventing extrusion material from leaking can be pursued in that a fit established between the bearing element and the bearing section of the holder has a gap width which enables defined leakage of the extrusion material. Furthermore, with respect to the fit, it can be provided that the fit has a defined gap width adapted to the defined leakage. On the one hand, continuous leakage of extrusion material from the housing of the extrusion head and a resulting lubrication of the bearing element, in particular of a bearing bush, can thereby be effected. On the other hand, it is possible for the extrusion material to penetrate into a gap between the bearing element and the holder, in particular the bearing section of the holder, to solidify and consequently, by means of the solidified extrusion material, for a sealing of the extrusion head to occur against broad leakage of extrusion material. In this case, the leakage should generally be less than 0.1 percent of the flow of extrusion material through the extrusion head.

Unconventionally, a design of the extrusion head consists in the bearing element being a bearing bush, wherein at least a portion of the bearing bush consists of an elastomer. The bearing bush can accordingly be formed in one piece and thus completely from an elastomer. In addition, it is also possible for the bearing bush to be designed in several parts and preferably in two parts, as also explained above, wherein in a structurally meaningful manner, the radially inner portion of the bearing bush consists of the elastomer. This is necessary in order to be able to ensure sealing. The elastomer selected for the bearing bush or the portion of the bearing bush would be selected in a creatively interesting embodiment in such a way that sealing against leakage of the extrusion material from the housing of the extrusion head is enabled and, at the same time, the function as a bearing element, in particular a plain bearing, is not limited.

In an embodiment, which is in particular creatively contrary to the aforementioned, the, exclusively, one portion of the bearing bush consisting of an elastomer is firmly connected to the bearing section and to the further portion of the bearing bush not consisting of an elastomer, wherein the portion of the bearing bush consisting of the elastomer, by deforming, prevents a sliding rotational and/or longitudinal movement of the holder in relation to the portion of the bearing bush consisting of the elastomer. The firm connection present between the bearing section and the portion of the bearing bush consisting of the elastomer, for example an elastomer ring, should preferably be a bonded connection. However, a force-fitting and/or form-fitting connection may also be present. The holder, in this case the bearing element of the holder, is thus not freely rotationally or longitudinally movable in a sliding manner in relation to the portion of the bearing bush consisting of the elastomer. In contrast, during a rotational and/or longitudinal movement of the holder and thus a pivoting and/or longitudinal movement of the mandrel about the axis transverse to the direction of extrusion, a preferably elastic deformation of the portion of the bearing bush consisting of the elastomer arises. Expected strokes can thus be provided in the present case and, at the same time, a practically optimal sealing of the extrusion head against leakage of extrusion material can be ensured.

In one embodiment of the invention, it should also be provided in a comparable manner that a seal connected to the bearing element and the bearing section of the holder in a firmly bonded or force-fitting and/or form-fitting manner and thus firmly, is formed between the bearing element and the bearing section, which seal, by deforming, prevents a sliding rotational and/or longitudinal movement of the holder in relation to the seal. Accordingly, in this embodiment as well, no freely sliding rotational and/or longitudinal movement between the holder, in this case the bearing section of the holder, and the seal would thus be enabled. A rotational and/or longitudinal movement of the holder and thus a pivoting and/or longitudinal movement of the mandrel could only be carried out on the basis of an elastic or even a reversibly plastic deformation of the seal. In this case as well, the expected strokes could be advantageously provided and, at the same time, a practically optimal sealing of the extrusion head against leakage of extrusion material could be ensured.

Particularly in combination with the adjustment of the circumferential gap previously shown, a development is seen as promising if, moreover, the mouthpiece is arranged in the housing so as to be axially movable in the direction of extrusion. For this purpose, it can first be explained that, in general, but in particular with regard to the explained axially movable arrangement of the mouthpiece in the housing of the extrusion head, the possibility would beneficially exist that the mouthpiece section, in contrast to the cylindrical embodiment described above and thus to a constant radius of the mouthpiece section, has a variable radius over at least a portion of its longitudinal extension. In turn, the opening could also have a variable radius over at least a portion of the extension of the mouthpiece in the direction of extrusion. As an example, it could be assumed for this purpose that the mouthpiece section and/or the opening in such an embodiment are conical in the direction of extrusion. With the design of at least one of the interacting components mouthpiece section and opening with a variable radius, it would accordingly be enabled that an axial movement of the mouthpiece along the longitudinal axis of the extrusion head and thus in or opposite the direction of extrusion effects a change in the geometry of the annular gap, which results in an adaptation of the wall thickness of the extruded hollow body in its longitudinal axial direction, without changing the basic cross-sectional shape. The wall thickness would accordingly increase or decrease over the entire cross section of the hollow body. This corresponds to an axial gap or annular gap and a wall thickness adjustment.

Furthermore, a design is determined in that the holder extends through the housing at least on one side up to an outer side of the housing, wherein one arm each is connected to the holder on each end side of the holder. In this case, the arm or arms constitute a means of translating a movement acting on an end of the arm facing away from the holder. In particular, a displacement could thereby be reduced, as a result of which a higher resolution of the pivoting movement of the mandrel and thus of the gap adjustment would be realized. This is also linked to the possibility of a finer compensation for occurring deviations of the hollow body from a target shape. In addition, a means initiating such an adjusting movement, such as an actuator, could be arranged at a position convenient in terms of installation space. When forming one arm per end of the holder, it is also possible to connect the ends of the arms facing away from the holder to one another, for example by means of a rod assembly. This would advantageously open up a way to apply an adjusting movement to both arms via only one means.

If, in particular, a regulation of the geometry of the variable, circumferential gap is to be provided, it is advantageous if, in one embodiment of the invention, the mandrel is connected, in particular via the holder, to at least one actuator, and a pivoting and/or longitudinal movement of the mandrel can thus be effected via the actuator. At least one actuator is preferably provided for each pivoting movement and for each longitudinal movement. By using motor-driven actuators, it is moreover advantageously possible to realize a compensation for a deviation of the extruded hollow body from its target shape, in particular in real time, via a control loop by initiating the pivoting movement and/or the longitudinal movement of the mandrel.

Against this background, a method for producing an elongated hollow body as an extrudate of an extrusion of the extrusion material by means of the aforementioned extrusion head is, furthermore, also provided. Within the scope of the method, a deviation of an actual shape, in this case in particular a cross-sectional shape and/or a wall thickness, of the extrudate from a target shape of the extrudate is determined, in particular permanently during extrusion. Furthermore, the circumferential gap of the extrusion head, in this case in particular in real time via the at least one actuator, is readjusted by means of a pivoting and/or longitudinal movement of the mandrel so as to compensate for the deviation. As a result, extruded hollow bodies can be produced with a high dimensional accuracy, which correspondingly have only a minor deviation or no deviation at all from their target shape. In order to carry out the method, it can be regarded as advantageous if, for example, the extrusion head has at least one measuring sensor by means of which the actual shape of the extrudate and/or of the extruded hollow body can be determined. Such a measuring sensor could, for example, be based on an optical measuring method and/or image processing. An X-ray based measuring principle is also conceivable. In addition, further measuring sensors for determining an existing pivoting movement and/or longitudinal movement about or along the axis could also be arranged transversely to the direction of extrusion. Furthermore, the determination of the viscosity of the extrusion material can also be included in the regulation.

The extrusion head 1 shown in FIG. 1 has the mandrel 2 designed in the shape of a torpedo, wherein an extrusion material can flow around the mandrel 2 in the housing 3 of the extrusion head 1 in the direction of extrusion L.

In this case, the direction of extrusion L is determined by the longitudinal axis of the extrusion head 1 or coincides with the longitudinal axis, wherein the extrusion material enters via the inlet opening 17 of the housing 3 formed upstream of the mandrel 2, the elongated hollow body exits as extrudate 16 from the outlet opening 18 of the housing 3 formed downstream of the mouthpiece 6. The longitudinal axis of the mandrel 2 is also aligned in the direction of the direction of extrusion L and also coincides with the longitudinal axis of the extrusion head 1.

The aforementioned torpedo shape of the mandrel 2 results from the fact that it has a cylindrical section and conical sections adjoining both sides of the cylindrical section in the direction of the longitudinal axis of the mandrel 2. Furthermore, the mouthpiece section 4 of the mandrel 2 adjoins the conical section facing the mouthpiece.

The end-side mouthpiece section 4 of the mandrel 2 is in this case arranged in the opening 5 of the mouthpiece 6 arranged downstream of the mandrel 2 in the direction of extrusion L, whereby the circumferential gap 7, which is variable in geometry and designed as an annular gap in this development, is formed between the mouthpiece section 4 and the mouthpiece 6.

The change in the circumferential annular gap 7 is made possible in this case by the mandrel 2 being mounted in the housing 3 so as to be pivotable about the axis Q transversely to the direction of extrusion L and longitudinally movable along the axis Q. On the basis of said mounting, the geometry of the annular gap 7 can be changed transversely in two degrees of freedom, in this case specifically radially to the direction of extrusion L, whereby an annular gap adjustment is established in the extrusion head 1 and a radial wall thickness adjustment of the extrudate 16 forming the hollow body is enabled.

In this connection, the mouthpiece 6 is also arranged in the housing 3 of the extrusion head 1 so as to be axially movable in the direction of extrusion L, as a result of which, in addition to the aforementioned radial annular gap adjustment or radial wall thickness adjustment, an axial annular gap adjustment or axial wall thickness adjustment is also realized in this development. The respective stroke, which the mouthpiece section 4 carries out in the opening 5 due to the pivoting movement and/or the longitudinal movement of the mandrel 2 about and/or along the axis Q is to be in a range of less than 0.5 millimeters, preferably less than 0.05 millimeters.

By means of these wall thickness adjustments, on the one hand, the geometric design of the hollow body resulting from the extrudate 16 could be adapted along its longitudinal axial direction. Preferably, however, the radial wall thickness adjustment is used to substantially avoid deviations of the extrudate 16 from its target shape. For this purpose, during the extrusion of the extrudate 16, a deviation of the actual shape, in this case in particular the cross-sectional shape and/or the wall thickness, of the extrudate 16 from a target shape of the extrudate is determined, and the annular gap 7 of the extrusion head 1 is readjusted by means of a pivoting and/or longitudinal movement of the mandrel 2 so as to compensate for the deviation.

In the development of FIG. 1, the axis Q is furthermore embodied via the elongated holder 8 designed as a mandrel holder, via which the mandrel 2 is accordingly mounted in the housing 3. The sections of the holder 8 directly adjacent to the mandrel 2 on two sides are designed as thin-walled webs 20. In this case, each web 20 is arranged on the mandrel 2 in such a way that the two thin sides of each web 20, i.e., the two sides of the webs 20 with the smallest dimensions, are aligned in the unpivoted position of the mandrel 2 shown in the direction of extrusion L so that a flow resistance of the webs 20 is minimal when the extrusion material flows around the mandrel 2. The two-sided mounting of the mandrel 2 is furthermore realized via the bearing elements 10 respectively arranged in the bearing seats 9 and designed as bearing bushes 12. In this case, a bearing section 11 is formed on each of the two parts of the holder 8, which is designed in two parts and provided as a mandrel holder, via which the holder 8, and thus the mandrel 2 connected to the holder 8, is mounted in the bearing bushes 12.

In order to seal the extrusion head 1 against leaking of the extrusion material, the sealing lip 13 is formed at the end of the lower bearing bush 12 facing the mandrel 2 in the illustration. Said sealing lip is deformed in the direction of the bearing section 11 of the holder 8 due to the pressure acting on the sealing lip 13 via the extrusion material during an extrusion process and is thus designed to be practically self-sealing.

As can be seen from the development of the extrusion head 1 in FIG. 1, the holder 8 extends through the housing 3 to an outer side of the housing 3 on two sides. In this case, one arm 14 each is arranged on the holder 8 at each end side of the holder 8, and the arms 14 themselves are also connected to one another via a rod assembly. The arms 14 are arranged on the holder 8 in this case via a force-fitting and/or form-fitting connection using the complementary polygon shapes 19 between the arms 14 and the holder 8. In order to realize the pivoting movement about the axis Q and the longitudinal movement along the axis Q transverse to the direction of extrusion L, the mandrel 2 is indirectly connected to two actuators 15 via the holder 8 and the arms 14. Via their adjusting movements, the pivoting and longitudinal movements of the mandrel 2 are initiated and the aforementioned readjustment to compensate for deviations is enabled. For this purpose, one actuator 15 engages on the rod assembly and one actuator 15 engages directly on the holder 8.

While the embodiments of this disclosure have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present disclosure covers further embodiments with any combination of features from different embodiments described above and below. Additionally, statements made herein characterizing the embodiments refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. An extrusion head, comprising:
   a housing;
   a mandrel mounted in the housing, wherein an extrusion material can flow around the mandrel in a direction of extrusion of the extrusion head; and
   a mouthpiece arranged downstream of the mandrel in the direction of extrusion,
   wherein the mandrel includes an end-side mouthpiece section arranged in an opening of the mouthpiece so as to form a circumferential gap between the end-side mouthpiece section and an opening in the mouthpiece, wherein the mandrel is pivotable about at least one axis transverse to the direction of extrusion, and wherein the mandrel is mounted so as to be longitudinally movable in the direction of the at least one axis, so as to change a geometry of the circumferential gap.

2. The extrusion head according to claim 1, wherein the mandrel is arranged on an elongated holder.

3. The extrusion head according to claim 2, wherein the extrusion head comprises at least one bearing element arranged in a bearing seat formed in the housing, and wherein the elongated holder is mounted in the bearing element via a bearing section formed on the elongated holder.

4. The extrusion head according to claim 3, wherein the bearing element is a bearing bush and a sealing lip is formed at an end side of the bearing bush.

5. The extrusion head according to claim 3, wherein a fit established between the bearing element and the bearing section of the elongated holder has a gap width which enables a defined leakage of the extrusion material, and/or the fit has a defined gap width adapted to the defined leakage.

6. The extrusion head according to claim 3, wherein the bearing element is a bearing bush, and wherein at least a portion of the bearing bush consists of an elastomer.

7. The extrusion head according to claim 6, wherein a first portion of the bearing bush consisting of the elastomer is firmly connected to the bearing section and to a second portion of the bearing bush not consisting of an elastomer, wherein the first portion of the bearing bush, by deforming, prevents a sliding rotational and/or longitudinal movement of the elongated holder in relation to the first portion of the bearing bush.

8. The extrusion head according to claim 3, wherein a seal, arranged between the bearing element and the bearing section of the elongated holder in a firmly bonded or force-fitting and/or form-fitting manner, which seal, by deforming, prevents a sliding rotational and/or longitudinal movement of the elongated holder in relation to the seal.

9. The extrusion head according to claim 3, characterized in that a contact seal is formed between the bearing element and the bearing section of the elongated holder.

10. The extrusion head according to claim 1, wherein the mouthpiece is axially movable within the housing in the direction of extrusion.

11. The extrusion head according to claim 1, wherein the elongated holder extends at least on one side through the housing to an outer side of the housing, and wherein an arm is connected to the holder on the outer side of the housing.

12. The extrusion head according to claim 1, wherein the mandrel is connected to at least one actuator, and wherein the pivoting and/or longitudinal movement of the mandrel can be effected by the at least one actuator.

13. A method for producing an elongated hollow body as an extrudate of an extrusion of extrusion material using an extrusion head; the extrusion head comprising a housing; a mandrel mounted in the housing; a mouthpiece arranged downstream of the mandrel in a direction of extrusion, wherein the mandrel includes an end-side mouthpiece section arranged in an opening of the mouthpiece so as to form a circumferential gap between the end-side mouthpiece section and an opening in the mouthpiece, wherein the mandrel is pivotable about at least one axis transverse to the direction of extrusion, and wherein the mandrel is mounted so as to be longitudinally movable in the direction of the at least one axis, so as to change a geometry of the circumferential gap, the method comprising: determining a deviation of an actual shape of the extrudate from a target shape of the extrudate, and adjusting the mandrel of the extrusion head to compensate for the deviation.

* * * * *